Jan. 12, 1960     L. E. FENN ET AL     2,921,183
POWER ACTUATED DIRIGIBLE SPOTLIGHT
Filed April 5, 1956     3 Sheets-Sheet 1
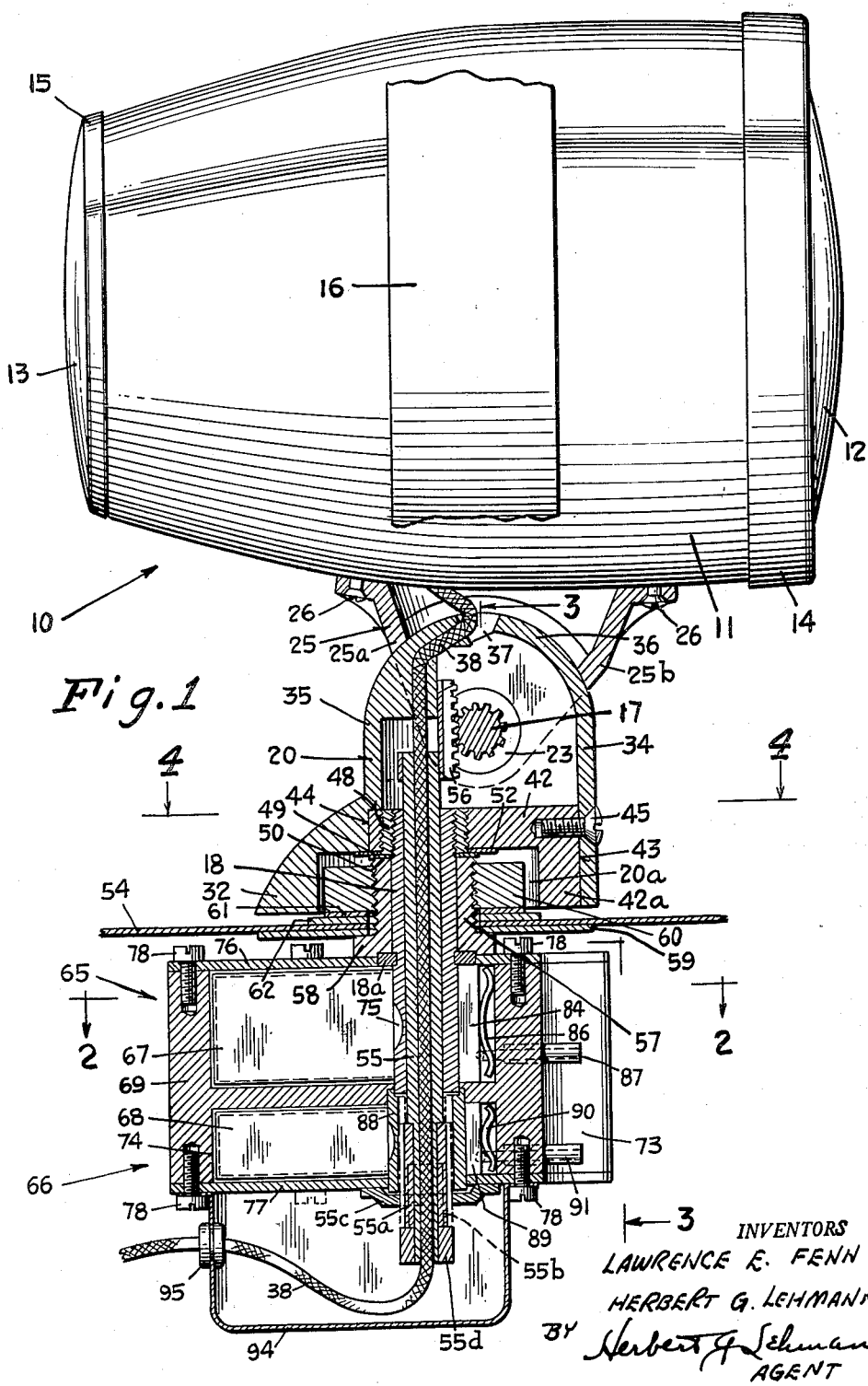
INVENTORS
LAWRENCE E. FENN &
HERBERT G. LEHMANN
BY Herbert G. Lehmann
AGENT

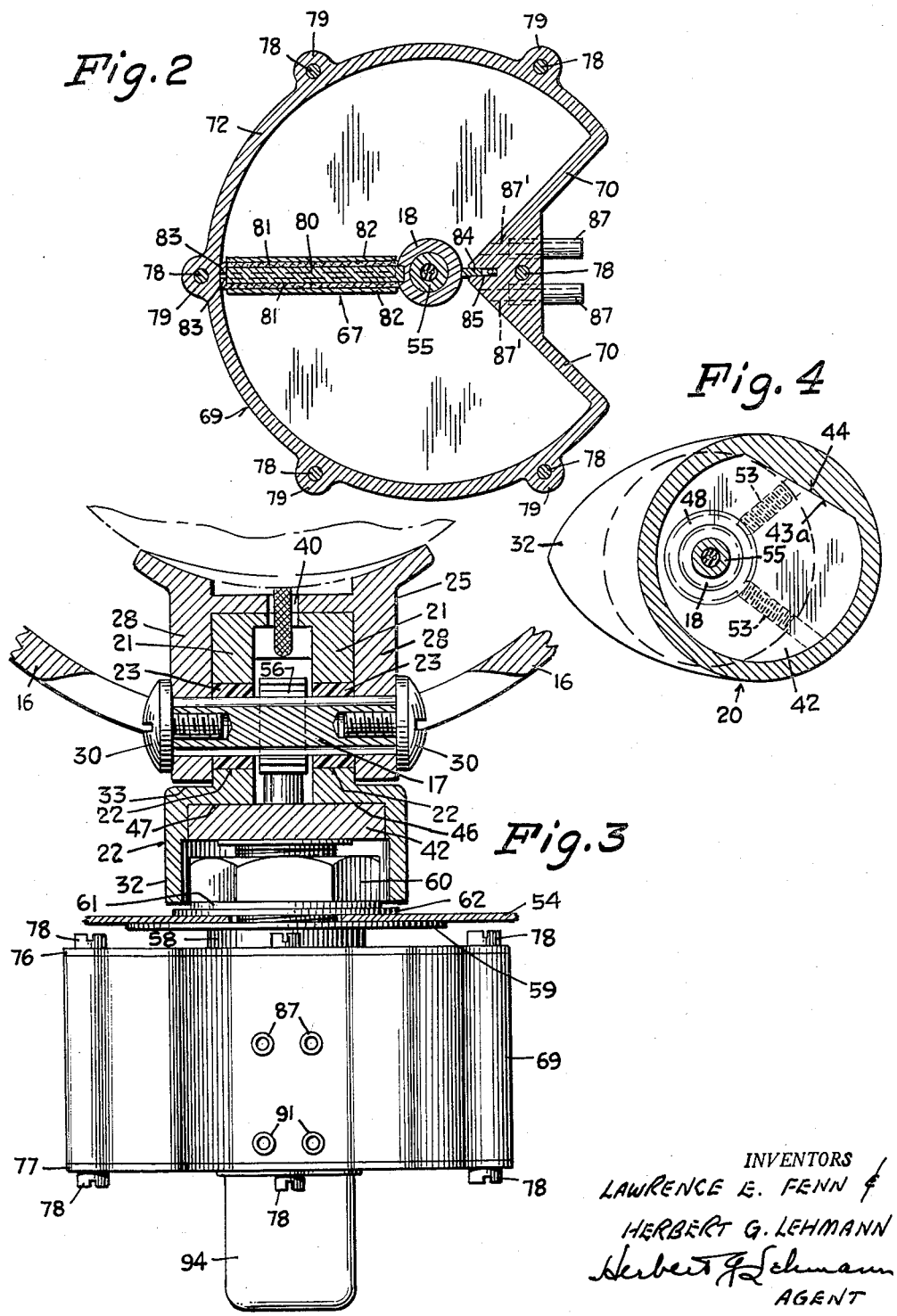

Jan. 12, 1960 L. E. FENN ET AL 2,921,183
POWER ACTUATED DIRIGIBLE SPOTLIGHT
Filed April 5, 1956 3 Sheets-Sheet 3

INVENTORS
LAWRENCE E. FENN &
HERBERT G. LEHMANN
BY Herbert G. Lehmann
AGENT

United States Patent Office 2,921,183
Patented Jan. 12, 1960

2,921,183

POWER ACTUATED DIRIGIBLE SPOTLIGHT

Lawrence E. Fenn, Bridgeport, and Herbert G. Lehmann, Easton, Conn.; said Lehmann assignor to said Fenn Application April 5, 1956, Serial No. 576,332

18 Claims. (Cl. 240—61.1)

This invention relates to relatively small, dirigible electric spotlights such as are commonly used on automotive vehicles, small boats and the like.

In the past, manually-operated, inner-controlled spotlights have been installed through the front corner posts of automobiles, through the roofs of truck cabs, etc. With the advent of the newer, curved or wrap-around windshields and elimination of the corner posts as such, this type of manually-operated spotlight now requires a side mounting through the car door.

Such door mounting, however, has not proved to be entirely feasible, and spotlights mounted in this manner are both inconvenient and impractical. For example, the inner handle of such a spotlight interferes with those instruments and controls of the automobile which are located to the left of the steering column. Also, during the installation of the light it is often difficult or impossible to obtain a satisfactory location wherein the light does not strike the fender when the door is fully opened. In addition, the normal usage and slamming of the door causes a considerable jarring of the spotlight, tending to weaken and loosen the mounting, and to cause other failure thereof. A greatly shortened filament life is also sometimes had.

Various small, power-operated spotlights have been from time to time proposed, which might be thought suitable for installation at other locations on a car, but these were not satisfactory because of their usually cumbersome construction and high initial or manufacturing cost; also, they were generally of unsightly appearance and some had a limited range angle, in addition to being difficult to install and adjust.

The present invention overcomes the above drawbacks and disadvantages of these prior, power-operated dirigible spotlights, and one object of the invention is to provide a novel and improved, motivated dirigible electric spotlight which is particularly well adapted to constitute an after-market item for installation on a motor vehicle at any of various desired locations, and which may be readily controlled from a remote point such as the driver's compartment of the car.

A further object of the invention is to provide an improved, vacuum-actuated spotlight which is particularly suitable for after-market installations on automobiles and the like.

Another object of the invention is to provide an improved, vacuum-operated spotlight of the above type, which is of exceptionally simple and inexpensive construction.

A still further object of the invention is to provide an improved motivated and/or vacuum-operated electric spotlight for an automobile, which is particularly adapted for through-the-fender mounting or mounting on other horizontal surfaces, and which requires but a relatively small hole in the fender or supporting surface to mount the light.

Another object of the invention is to provide an improved and greatly simplified driving transmission for a motivated dirigible spotlight, by which power transmitted through a single small mounting hole may in response to turning moments applied to the transmission effect independent angularly related turning movements of the lamp head.

A feature of the invention resides in the provision of a fender-mounting or like spotlight of the vacuum-powered type, wherein the lamp head constitutes most of the visible part of the spotlight, and wherein the actuating mechanism is mostly hidden or disposed below the mounting surface, thereby to not only facilitate the styling of the light and enable it to have an attractive appearance but to also effect a divided placement of the mass so as to obtain insofar as possible a static balance and thereby minimize the effect of vibration, shock, etc.

Yet another object of the invention is to provide an improved, vacuum-operated spotlight as above set forth which is sturdy and reliable in its operation at all times, even under adverse conditions of use.

A further feature of the invention resides in the provision of a vacuum-operated spotlight as characterized, which may be easily and quickly, accurately adjusted to direct the beam to the desired location.

Another feature of the invention resides in the provision of a vacuum-operated spotlight of the above type, which has a relatively wide useful angle of movement both horizontally and vertically, while still incorporating a hidden, live electric lead for the lamp.

A further object of the invention is to provide an improved vacuum-operated spotlight of the type specified, wherein adjustment of the lamp horizontally will not disturb any vertical adjustment, and vice versa.

A still further object of the invention is to provide a vacuum-operated spotlight of the above type, which may be made up as a relatively small and compact unit.

Yet another and important object of the invention is to provide an improved vacuum-operated electric spotlight which may be easily and quickly installed, without requiring specialized tools or major alterations to the car or body structure, and which when installed will constitute a strong and sturdy accessory to the car.

The accomplishment of the above objects will be hereinafter specifically explained in connection with the detailed description of the several embodiments of the invention, and other features and advantages will hereinafter appear.

In the drawings accompanying this specification, similar characters of reference indicate corresponding parts wherever possible in the several views, in which:

Figure 1 is a view partly in side elevation and partly in vertical section, of the improved vacuum-actuated electric spotlight of the present invention.

Fig. 2 is a horizontal section taken on line 2—2 of Fig. 1.

Fig. 3 is a view partly in front elevation and partly in vertical section, taken on line 3—3 of Fig. 1.

Fig. 4 is a horizontal section taken on line 4—4 of Fig. 1.

Figure 5:
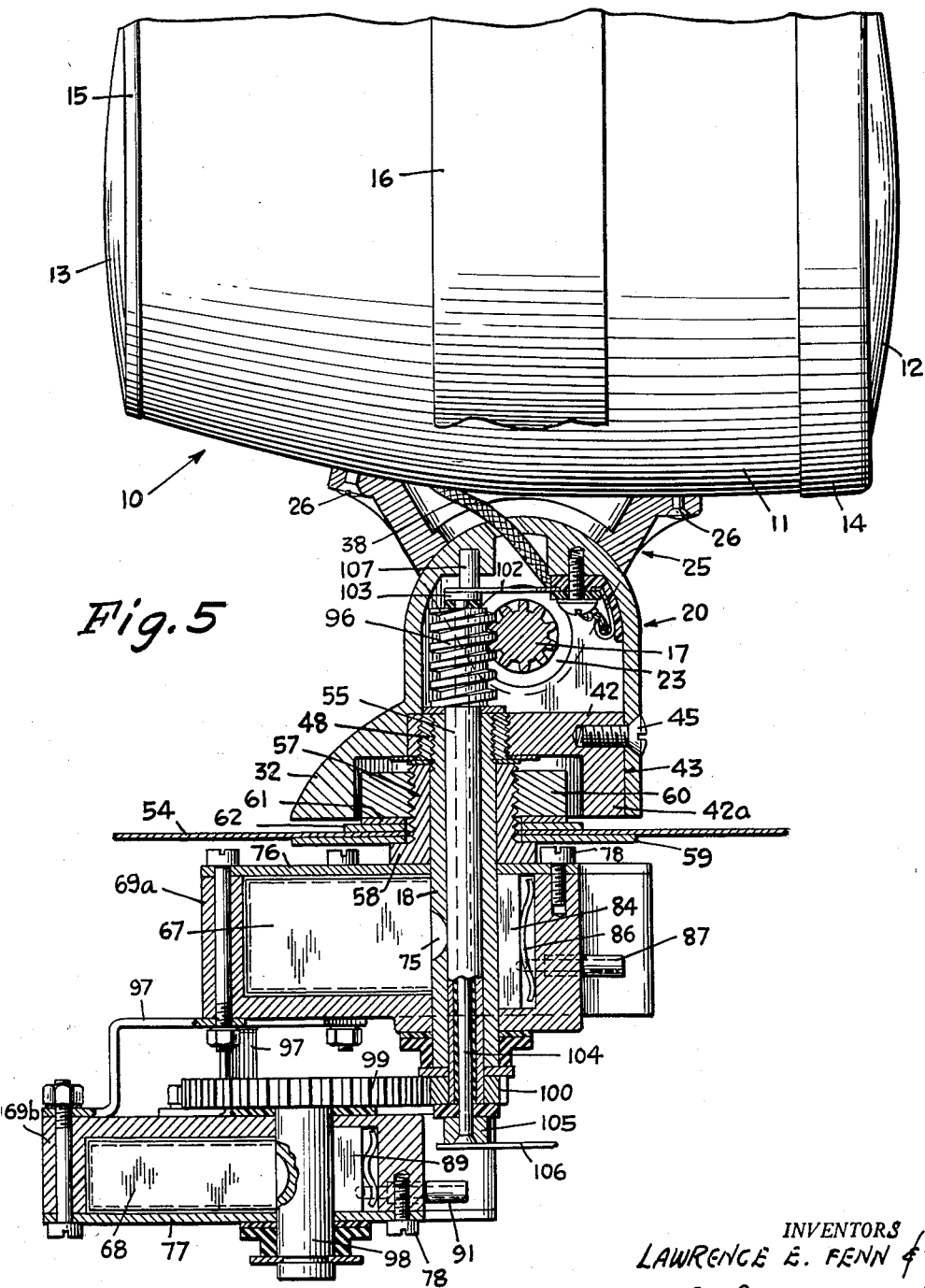
Fig. 5 is an elevational-sectional view somewhat on the order of Fig. 1 and illustrating another embodiment of the invention.

Referring to Figs. 1 and 3, the vacuum-actuated spotlight shown therein comprises a lamp head indicated generally by the numeral 10, which is universally mounted for turning movements about a pair of different axes (herein illustrated as horizontal and vertical) whereby it may be swung or adjusted both horizontally and vertically to cover a very large area or field. The lamp head 10 may have any desired configuration and construction, being shown herein as a somewhat cylindrical shell 11 having a lamp unit 12 at its forward end, and having a mirror 13 at its rearward end. The shell 11 may have suitable rims 14 and 15 to provide for mounting of the lamp unit 12 and mirror 13, and may also have, for styling or ornamentation purposes, a wide concentric ring or band 16 disposed approximately midway of the front and rear of the shell and spaced an appreciable distance therefrom.

In Figs. 1–3 the horizontal axis about which the lamp head 10 may turn is defined essentially by a relatively short and heavy piece of pinion rod 17, and the vertical axis about which the head 10 may turn is defined by a tubular, vertical shaft 18. The pinion rod 17 constitutes a pivot pin forming part of a driving swivel joint which is seen to be located wholly below the shell 11; with such disposition of a driving swivel the components thereof may be subject to relatively large, incidental forces which might occur for example when the lamp is bumped or otherwise accidentally struck or pushed.

We have found, however, that by making the pivot in the form of a pinion rod it may additionally constitute a strong, splined driving connection, as will be hereinafter fully brought out, which is most effective in successfully resisting accidental forces of large turning moment and in providing for reliable operation of the present spotlight under even adverse conditions of use, vibration, etc.

The universal mounting means for the lamp head 10 further comprises a mounting head 20, which may be advantageously formed as a casting said mounting head having a pair of upstanding apertured bearing blocks or pillars 21 disposed in spaced parallel relation to each other, through which the pinion rod 17 passes, and in which it has a bearing. In connection with such bearing, the pillars 21 are provided with bearing apertures 22 of appreciably larger diameter than the outside diameter of the pinion rod 17, and bearing bushings 23 are provided, having outside cylindrical surfaces slidably fitting within the bearing apertures 22 and having toothed, inner bores closely fitting the pinion rod 17. The bearing bushings 23 may, for example, be advantageously formed of a plastic composition such as nylon (synthetic fiber forming polymeric amide) which has extreme toughness and strength, admirably suiting it for this purpose.

Referring to Fig. 1, the lamp head 10 is provided with a mounting bracket 25 which may be attached to the shell 11 in any suitable manner, as by rivets 26 or the like. The mounting bracket 25 has a pair of spaced, depending apertured ears or bearing blocks 28 adapted to extend alongside of and engage the remote, outside faces of the pillars 21 of the mounting head 20.

In accomplishing the splining function of the pinion rod 17, according to the invention, the apertures of the ears 28 are made to have a tooth-like configuration and to closely slidably fit and receive the end portions of the pinion rod. As shown in Fig. 3, the pinion rod 17 may be retained in its operative position against dislodgement by the provision of screws 30 threaded into the ends of the rod.

It will be noted that the pinion rod 17 provides a very sturdy, splined drive by virtue of the fact that all of its teeth are interlocked with the teeth in the bores of the lamp bracket ears 28, thus requiring that a considerable amount of material be sheared off before the spline fails. Since the pinion rod 17 may be formed of steel, it will have great strength and resistance to such shearing, and accordingly provides a reliable means by which a powered drive may be had to the lamp head 10, as well as forming an effective pivot for the lamp head about the mounting head 20.

As seen in Figs. 1 and 3, the mounting head 20 comprises a hollow, inverted cup-shaped body having a recess 20a and a peripheral skirt 32 disposed around most of its lower portion, said skirt being cut away as indicated at 33 to provide clearance for the bracket ears 28. The pillars 21 of the mounting head 20 may be joined together at their forward and rear portions by wall sections 34 and 35 and at their upper portions by a wall section 36 provided with an aperture 37 to admit a live supply wire 38 to the lamp head 10.

As shown, in Fig. 1, the pillar 21 and the upper wall 36 connecting them have an outwardly-disposed surface of cylindrical configuration, engaging an internal cylindrical surface provided on the underside of the head bracket 25 adjacent the upper base portions of the ears 28 thereof. Thus there is constituted by such engaging cylindrical surfaces a large bearing area which, in conjunction with the pivoting pinion rod 17 provides a strong and sturdy mounting for the bracket 25 on the mounting head 20.

To accommodate the live supply wire 38, the bracket 25 is provided with a slot 40 as shown, whereby the lamp head 10 may be tilted forward or backward about the pivot 17 without pinching the said wire against the wall 36.

The provision of the supply wire 38 or equivalent live conducting means which is wholly disposed within the mounting head 20 and bracket 25, and is not at any point exposed externally, constitutes an advantageous feature of the present spotlight construction. However, such disposition of the live wire 38 tends to inherently limit the maximum or total angle of tilt of the lamp head 10 vertically. By the present invention, however, in spite of the incorporation of the wholly concealed live wire 38 a relatively large useful tilt angle is obtained by virtue of the novel structure of the lamp head bracket 25. This bracket is so constituted and arranged that it enables a relatively large upward inclination of the lamp head to be obtained at the expense of the downward inclination. We have found that normally the downward inclination need not be as great as the upward inclination, while still enabling the lamp to adequately serve the purposes desired. Accordingly, the bracket 25 is arranged to provide for a downward inclination of approximately 20 degrees and an upward inclination of approximately 45 degrees, all without pinching the live wire 38 or exposing the opening 37 for the wire, which is provided in the mounting head 20. Referring to Fig. 1, the rear wall 25a of the bracket 25 is disposed closer to the aperture 37 than the front wall 25b, with the lamp head 10 in the horizontal position shown. When the lamp head 10 is tilted downward and to the right 20 degrees, the wall 25a will approach but fall short of the aperture 37, and when the lamp head 10 is tilted upward and to the left through an arc of 45 degrees, the front wall 25b will approach and fall short of the aperture 37. Thus the lamp head 10 may have a relatively large useful angle of adjustment about the horizontal pivot 17, while still incorporating in the spotlight a wholly concealed live lead for the lamp unit 12.

For the purposes of facilitating mounting of the spotlight on a supporting surface, and to sturdily support the mounting head 20 on the vertical shaft 18 while still permitting the head to be easily secured to the shaft during the after-market installation of the spotlight, also to enable the mounting hole for the spotlight to be of reduced size as will be later brought out, we provide within the skirt portions 32 of the mounting head 20 an internally threaded eccentric bushing 42 having an outer, generally cylindrical periphery 43 provided with a positioning flat 43a and adapted to closely fit within a flatted cylindrical bore 44 defining the recess 20a of the mounting head 20. The eccentric bushing 42 has a snug fit in said bore, and is removably secured to the head 20 by a plurality of fastening screws 45, which may advantageously be three in number, located on 120 degree centers. As seen in Figs. 1 and 4 the bushing 42 has a depending, crescent-shaped portion 42a to increase its bearing surface within the head 20. In order to accurately vertically position the bushing 42 in the mounting head 20, the latter may be provided with shoulders 46 and 47, as shown in Fig. 3.

Between the eccentric bushing 42 and the upper end or extremity of the vertical shaft 18 we provide as a permanently assembled part of the latter a double-threaded bushing 48, so called because it is both internally and externally threaded. The upper extremity of the vertical shaft 18 is also externally threaded, by means of which the bushing 48 may be screwed onto said extremity, preferably in a factory-assembly operation, being pulled up tight against a flat washer 49 resting on a shoulder 50 provided on the shaft 18. After attachment of the double-threaded bushing 48 to the shaft 18, the bushing may be permanently retained thereon by any suitable means, as for example by sweating it or welding it to the shaft. The double-threaded bushing 48 thus, in effect, becomes a permanent part of the shaft 18 during the factory-assembly operation, and has an outside diameter sufficiently small to pass through the main, mounting nut of the light, as will be later brought out.

It will be understood that, during installation of the spotlight on the automobile or other piece of equipment, the eccentric bushing 42 may be readily threaded onto the double-threaded bushing 48, and thereafter the mounting head 20 carrying the lamp head 10, attached to the eccentric bushing. Prior to this being done, a second flat washer 52 is preferably slipped over the double-threaded bushing 48, to provide a shoulder of substantial area, against which the eccentric bushing 42 may bear.

As seen in Fig. 4, the eccentric bushing has a plurality of set screws 53 which may be tightened against the double-threaded bushing 48 after assembly thereto, thereby to securely lock together the two bushings against relative movement, and such procedure is done prior to the above mentioned assembly of the mounting head 20 to the bushing 42.

In accordance with the above construction the lamp head 10 may be turned about a vertical axis as represented by the shaft 18 by merely turning the latter, and may be tilted upward or downward about a horizontal axis as represented by the pinion rod 17. In Fig. 1 the shaft 18 is shown as extending through an opening in a horizontal, supporting wall 54 which may, for example, be part of the front fender of an automobile. Thus the shaft 18 may be driven or turned from beneath the fender 54, to swing the lamp head 10 horizontally.

It will be noted that, in the above described structure the small-diameter components, such as the upper extremity of the shaft 18, the double-threaded bushing 48 and the internal periphery of the eccentric bushing 42, are all threaded and have relatively large total areas of engagement, thereby to provide a very sturdy construction despite the small diameters. The larger-diameter portions, comprising the outer periphery of the eccentric bushing 42 and the bore of the mounting head 20, having a close fit and being secured together by the screws 45, also provide for a strong and sturdy construction, by which the present improved spotlight is able to withstand relatively large forces while still enabling it to be mounted in a relatively small mounting hole.

In accordance with the invention, for the purpose of effecting vertical tilting of the lamp head 10 from a point below the fender 54 there is provided a single, sturdy, axially-movable, tilting shaft 55 which bears and is slidable in the shaft 18. On the upper extremity of the tilting shaft 55 there is rigidly affixed a rack 56 meshing with the pinion rod 17, thereby to effect a turning of the pinion rod and tilting of the lamp head 10 in response to upward and downward movement of the tilting shaft 55.

In the structure set forth above the pinion rod 17 is disposed to one side of the common axis of the shafts 18 and 55, and in connection with such location the provision of the eccentric bushing 42, by which the mounting head 20 is eccentrically disposed on the shaft 18, enables a relatively-small, mounting hole to be provided in the fender 54 while still enabling the transmission of power from a point below the fender to the mounting head 20 for the purpose of both tilting the lamp and also swinging it horizontally, and while still enabling current to be carried to the lamp unit 12 by means passing through said mounting hole.

For easily mounting the spotlight on the fender 54, as shown, we provide as part of a sub-assembly of the spotlight a bearing fitting 57 through which the vertical shaft 18 extends, and in which it turns, said fitting being readily slipped through the fender from below and providing a strong and sturdy support for said shaft while at the same time requiring a mounting hole which is not greatly larger than the outside shaft diameter. The bearing fitting 57 is in the form of a threaded collar having a bore slidably receiving the shaft 18, and having at its lower end an external, annular shoulder 58 engaging a large, flat mounting plate or washer 59 disposed against the undersurface of the fender 54. The bearing collar 57 extends upwardly through the fender 54 as seen in Fig. 1 and has a heavy nut 60 bearing against washers 61 and 62, the latter of which is in engagement with the upper surface of the fender 54. Thus the bearing fitting 57 may be securely and tightly attached to the fender, with the mounting plate 59 engaging a relatively large area of the fender to provide a rigid mounting means.

The shaft 18 may conveniently have a thrust bearing in the form of a split ring 18a, engaging the lower end of the bearing fitting 57 whereby, in conjunction with the double-threaded bushing 48 axial movement of the shaft in said fitting is prevented.

It will now be understood that the shafts 18 and 55 and the bearing fitting 57, together with the double-threaded bushing 48 may be preassembled at the factory, and that during the after-market installation of the spotlight, such assembly will be passed upward through the hole provided in the fender 54, whereupon the washers 61 and 62 may be put in place, and thereafter the nut 60 securely tightened to attach the fitting 57 to the fender. After this is done, the installation of the lamp is continued by attachment of the eccentric bushing 42 to the double-threaded bushing 48, by locking of the set screws 53, and by attachment of the mounting head 20 to the eccentric bushing 42 by means of the fastening screws 45. Thereafter, the preassembled unit comprising the lamp head 10 and bracket 25 may be attached to the mounting head 10 by applying the bracket to the mounting head and inserting the pinion rod 17. Thus there is effected a simple and easy installation of the spotlight on the vehicle, by structure essentially as above described.

Also, as already pointed out above, by the provision of the pinion rod 17 functioning as both a driving spline and a pivot in conjunction with the rack 56, and by the provision of the study pillars 21 of the mounting head 20 and ears 28 of the lamp bracket 25, the splotlight is enabled to withstand appreciable exterior forces which may be applied to it, without failure of the components. In this connection, it will be noted that the rear wall 35 of the mounting head 20 may be made to engage and back up the rack 56, thereby to eliminate lateral stress on the inner shaft 55 whenever the lamp head is subjected to external forces such as an accidental blow, or a person leaning against the lamp, etc.

In accordance with our invention we further provide a novel and advantageous, greatly simplified and inexpensive yet reliably and powerful motivating means for actuating the lamp head 10 through the medium of the shafts 18 and 55, such actuating means being disposed below the fender 54 where it is out of sight, and being so arranged that it may be readily controlled from a remote point, as for example the driver's compartment of the vehicle. Referring to Figs. 1 and 2, this improved and compact motivating means comprises upper and lower vacuum-operated motors 65 and 66, said motors respectively driving the shafts 18 and 55.

The vacuum motors 65 and 66 comprise rotary, generally rectangular vanes 67 and 68, preferably disposed in a single vacuum casing 69 having separate compartments which the vanes respectively occupy. As seen in Fig. 2, the upper compartment of the vacuum casing 69 has generally a sector shape, covering an arc of approximately three right angles, with a pair of angularly-disposed, straight side walls 70 meeting each other and at their other ends joining a cylindrical-shaped side wall 72. The construction of the vacuum casing 69 for the lower motor 66 is similar, having straight side walls 73 and a cylindrical-shaped side wall 74. Thus the vacuum casing as above set forth may be readily and advantageously fabricated in the form of a single metal casting.

The rotary vane 67 is rigidly affixed to the vertical shaft 18, and to facilitate its positioning and attachment the vane may be provided with a tongue 75, extending into a keyway provided in the shaft. Preferably the vane is welded or silver soldered to the shaft, to provide a strong unitary structure.

The vacuum casing 69 further comprises upper and lower end plates 76 and 77, which may be secured to the side walls 70 and 72 by screws 78 threaded into bosses 79 as shown. The bearing fitting 57 is rigidly attached to the upper end plate 76 in any suitable manner, as by welding. Referring to Fig. 2, the vane 67 may comprise a main inner plate 80 to which molded facing 81 are attached, as by means of clamping plates 82. The molded facings 81 have flanges 83 extending along three edges, thereby to function as cupped packings by which a tight seal is effected between the vane and the interior walls of the compartment, for preventing passage of air and loss of power in the motor.

Also, for the purpose of minimizing leakage and to eliminate certain critical tolerances between the shaft and casing, in accordance with the invention, we provide a sealing strip or leaf 84 engaging the shaft 18 and carried in a slot 85 of the casing, said strip being spring charged by a wire spring 86, which maintains it in engagement with the shaft 18 and under continual force.

Referring to Fig. 2, tubular fittings 87 are provided, carried by the casing 69 and communicating through ports 87' with opposite portions of the upper compartment of the casing, thereby to enable a vacuum to be produced in one portion or the other for causing the vane 67 to be driven either clockwise or counterclockwise.

The construction of the lower vane 68 is similar to that of the vane 67 just described, the vane 68 however being rigidly attached to a hub 88 extending around the inner shaft 55. The vacuum casing 69 has a second sealing strip or leaf 89 charged by a spring wire 90 and held in engagement with the hub 88, similar to the sealing strip 84 and spring 86.

In accordance with this invention a novel, simple means is provided by which, notwithstanding the use of the concentric shaft 18 and 55, the horizontal and vertical adjustments of the lamp head 10 may be independent of each other, thereby to greatly facilitate and simplify aiming of the lamp and/or adjustment of the mirror. As shown, the shaft 55 at its lower extremity is provided with a reduced diameter on which a sleeve 55a is rotatably carried but held against relative axial movement. The sleeve 55a has a plurality of screw threads having a large lead or pitch, and the hub 88 is internally threaded to receive the sleeve 55a whereby a driving connection is established therebetween, causing axial movement of the sleeve and the shaft 55 in response to turning movement of the vane 68, provided the sleeve is not allowed to turn. To effect this latter, the sleeve 55a has a pair of oppositely disposed flats 55b and extends through a key plate 55c rigid on the end plate 77 and having a flatted aperture receiving the sleeve. A collar 55d on the lower extremity of the shaft 55 retains the sleeve in place on the shaft while permitting turning of the shaft within the sleeve, and the latter may have axial movement but not turning movement, due to the key plate 55c.

With the above construction, it will be readily understood that arcuate or turning movement of the vane 68 and hub 88 will result in vertical movement of the sleeve 55a and shaft 55, either upward or downward, to effect vertical tilting of the lamp head 10. However, whenever the vane 68 is allowed to remain stationary and the vane 67 actuated to effect horizontal adjustment of the lamp head 10, this will in no way disturb the vertical setting of the lamp head by virtue of the shaft 55 being freely turnable in the sleeve 55a and the latter being held against turning by the key plate 55c. It is understood, of course, that the shaft 55 and rack 56 will at all times turn with horizontal turning movement of the lamp head 10 and mounting head 20. Independence is thus effected in a most simple and advantageous manner between the vertical and horizontal adjustments of the lamp head, without resorting to clutches, decoupling devices and the like.

The vacuum casing 69 has a second pair of tubular fittings 91 communicating with opposite portions of the lower compartment thereof, thereby to effect motivation of the vane 68 in either of opposite directions. By the provision of the multiple thread elements of relatively large lead or pitch between the hub 88 and the sleeve 55a a strong and positive drive is established, by which accidental forces resulting from blows on the lamp head 10 or other causes will be stoutly resisted without failure of the components. It will be seen that large areas of the said thread elements are always in contact with each other, as well as large areas of the threads of the rack 56 and pinion 17. Thus shearing stresses are distributed and greatly lessened, minimizing the possibility of failure and providing for reliable operation of the spotlight under adverse or severe conditions of use.

By the provision of the decked or superposed vacuum motors comprising the vanes 67, 68 and the two-compartment casing 69 an extremely small and compact power means is had, which is at one and the same time extremely simple and economical to fabricate, and powerful in its operation. In connection with the latter I have found that turning moments in excess of twenty-five pound inches may be exposed from the vane 67, with a proportionate torque from the vane 68, thereby providing an adequate motivating force for adjusting and directing the lamp head 10. No expensive assemblies or components are required, such as wound armatures, commutators and the like which form parts of an electrical drive, and thus there is greatly simplified the overall construction, enabling a low initial cost to be had and as a consequence a low list price.

For the purpose of connecting the live lead 38 from the lamp to a source of current, the inner shaft 55 is preferably made hollow or with a bore through which the wire 38 may be brought. A housing 94, having an insulating bushing 95 for the wire 38, may be secured to the lower portion of the vacuum casing 69 by certain of the end plate screws thereof, as illustrated in Fig. 1.

An alternative method of installation of the spotlight above described, may be carried out as follows: The lamp head 10, mounting head 20, pinion wire 17, rack 56 and shaft 55 attached to the rack together with the live lead wire 38 may all be factory-assembled, the sleeve 55a and the collar 55d being, however, left off of the shaft 55. Also, the vacuum motors and including the sleeve 55a may be completely factory-assembled in the casing 69, with the end plates 76 and 77 in place, and such preassembly may include the bearing fitting 57 and the double threaded bushing 48, but not the eccentric bushing 42 or the clamping nut 60. The vacuum motor assembly is applied to the underside of the fender 54, with the fitting 57 extending up therethrough, and the nut 60 then tightened on the fitting after the various washers have been put in place. The eccentric bushing 42 is then screwed onto the double-threaded bushing 48 and locked by its set screws. The lamp head assembly is then applied, by inserting the shaft 55 thereof downward into and through the outer shaft 18, the mounting head 20 being fastened by means of the screws 45. The threaded sleeve 55a, included in the vacuum motor assembly, will of course be now carried by the shaft 55, whereupon the collar 55d may be attached to the lower extremity of the shaft 55 and locked thereon, by the installer. Any suitable means for attaching the collar may be employed, as for example screw threads between the collar and the shaft 55, and radial apertures in the shaft and collar which, when aligned, can receive the ends of a U-shaped wire spring by which the collar will be locked against relative turning.

Inasmuch as the inner shaft 55 does not have rotation with respect to the lamp head 10 and only limited rotation with respect to the housing 94, and since the shaft has but limited axial movement, the live wire 38 may be adequately protected against short circuit by abrasion-resistant insulation such as Teflon (tetrafluorethylene plastic). The use of the live wire 38 in the manner shown thus eliminates the necessity for spring-charged brush contacts, slip rings and the like, thereby further simplifying the construction and reducing the cost of the present improved, motivated spotlight.

A modification of the invention is shown in Fig. 5, wherein parts similar to those already described have been given like characters. Essentially the difference between the embodiment of the invention shown in Fig. 5 and that of Figs. 1-4 resides in the provision of a worm 96 on the shaft 55, for engagement with the pinion rod 17, thus involving a turning movement of the shaft 55 to effect tilting of the lamp head 10. Also, in place of a single vacuum casing for the vanes 67 and 68 two casings 69a and 69b are provided, constructed as separate castings joined together by brackets 97. The lower vane 68 is not connected to a hollow hub but instead to a short stub shaft 98 carrying a gear 99 meshing with a pinion 100 carried by the inner shaft 55. Thus turning movement of the vane 68 will result in a stepped-up turning movement of the shaft 55, to effect vertical tilting of the lamp head 10.

While a change of the vertical setting of the lamp head 10 will occur during horizontal swinging movement of the lamp head, by virtue of the shaft 55 in Fig. 5 remaining stationary for such condition, the amount of vertical movement may be made quite small by employing a worm having a very small lead, and by employing a high ratio between the gear 99 and the pinion 100. Thus the net effect of the change in vertical position, with change in horizontal position of the lamp head 10, will not greatly adversely affect the desired adjustment and aiming of the lamp.

Another departure in the embodiment of the invention shown in Fig. 5, from that of Figs. 1-4, involves the provision of the current supply for the live lead 38. In Fig. 5, this lead is connected to an insulatedly-mounted brush 102 bearing against one end 103 of a current-carrying rod 104 insulatedly secured in the shaft 55. At the lower end of the shaft 55, the rod 104 has a contact head 105 engaging a second spring-charged brush 106 which may be connected in any suitable manner to the primary supply.

Within the mounting head 20 an insulating thrust plug 107 may be provided, engaging the brush 102 for the purpose of assuming thrust forces imparted to the worm 96 by the pinion rod 17.

It will be readily appreciated from a consideration of the above constructions that we have provided a novel, power-actuated dirigible spotlight having many unique features and advantages by which it is admirably adapted for after-market sales as an automobile accessory item. The spotlight is extremely simple in its construction and economical to fabricate, is powerful and reliable in operation, and has a wide range of adjustment by which a large field may be covered. Also, of importance in an after-market item is the ease of installation of the present spotlight and the ability to install the light in various locations on the vehicle. Moreover, the present improved spotlight requires but a single mounting hole of relatively small size. That portion of the light which shows above the fender is mainly the lamp head, which may be relatively small and compact, since the power-operated actuating mechanism is located below the fender.

In connection with this feature, it will be noted that the total mass or weight of the spotlight is divided, major portions being disposed both above and below the fender 54. There is thus effected division of the mass, and a static balance is approached, by which the effects of vibration, road shock and the like on the spotlight are greatly minimized.

Vacuum may be brought to the vacuum motors by flexible rubber tubing, preferably of the twin duct type whereby only a total of two tubes are required to effect all movements of the lamp. Such tubes may be readily passed through available openings in the fenders, or openings may be provided where required, and the tubes may be pushed through existing channels without great difficulty. The assembly of the spotlight during its installation is relatively simple, and may be easily carried out by one possessing only ordinary mechanical skill. The various operating components are so constituted and organized as to avoid concentrated stresses and instead to distribute the same over relatively large areas or zones, thereby to minimize the likelihood of their failure if the spotlight should be inadvertently subjected to forces other than those encountered in its normal operation. Thus there is insured reliable and trouble free operation.

Variations and modifications may be made within the scope of the claims and portions of the improvements may be used without others.

We claim:

1. A power-operated dirigible spotlight comprising a lamp head and a plurality of mounting means movably supporting the same for turning movements about two different axes; a pair of independently movable, rotary driving vanes disposed adjacent each other; means comprising a pair of coaxial, telescoped, concentric shafts coupling said vanes to said lamp head to drive the same about the said axes, one vane being rigid on the outer of said shafts; and means constituting vacuum casings containing said vanes, for reversibly actuating the same by vacuum produced at a remote point.

2. The invention as defined in claim 1 in which the means constituting the vacuum casings comprises a single casting having recesses opening in opposite directions.

3. The invention as defined in claim 1 in which the concentric drive shafts are connected respectively to the vanes, and in which the vacuum casings are superposed one on the other, both said shafts passing through one of said casings.

4. The invention as defined in claim 1 in which at least one of said vacuum casings has a sector-shaped chamber for a vane, extending in an arc on the order of approximately three right angles.

5. The invention as defined in claim 1 in which one of said vacuum casings has bearing means for the outer shaft, an internally recessed wall adjacent said bearing means, and a spring-charged fluid-sealing leaf disposed in the recess of said wall and adapted to engage the shaft carried by the bearing means, to effect a fluid-tight seal therewith.

6. The invention as defined in claim 1 in which the means coupling the vanes to the lamp head includes a drive providing a step-up gear ratio between one vane and the lamp head, said one vane having a smaller area than the other vane.

7. The invention as defined in claim 1, in which the said coupling means also comprises screw thread elements between the other vane and the inner one of the telescoping shafts.

8. A power-operated dirigible spotlight comprising a lamp head and a plurality of mounting means movably supporting the same for turning movements about two different axes; a pair of concentric inner and outer drive shafts extending from said lamp head; a pair of juxtaposed independently movable, fluid-responsive, powered drive members disposed adjacent those ends of the shafts located remote from the lamp head, one of said members being rigid on the outer drive shaft; and means including said drive shafts, coupling said drive members to said lamp head to drive the same about the said axes, said means including a spiral-thread driving element on the inner drive shaft and a cooperable driving element meshing therewith to effect a mechanical advantage in the coupling which includes the inner shaft, whereby less force is required of the associated drive member to move the lamp head.

9. A power-operated dirigible spotlight comprising a lamp head and a plurality of mounting means movably supporting the same for turning movements about two different axes; a pair of concentric drive shafts extending from said lamp head; a pair of juxtaposed, independently movable, fluid-responsive powered drive members disposed adjacent those ends of the shafts which are located remote from the lamp head, one of said members being rigid on the outer drive shaft; and means including said drive shafts, coupling said drive members to said lamp head to drive the same about the said axes, the means which couples one of said members comprising a screw threaded element carried by one shaft and a nut part connected to the member and engaging said threaded element to impart axial movement to the shaft when the member is turned.

10. The invention as defined in claim 9, in which the screw threaded element is freely turnable with respect to the shaft carrying it, and in which there is a keying means preventing turning of said element while permitting movement thereof axially with the shaft.

11. A power-operated dirigible spotlight comprising a lamp head and a plurality of mounting means movably supporting the same for turning movements about two different axes; a pair of concentric drive shafts extending from said lamp head; a pair of juxtaposed, independently movable, fluid-responsive powered drive members disposed adjacent those ends of the shafts which are located remote from the lamp head, one of said members being rigid on the outer drive shaft; and means including said drive shafts, coupling said drive members to said lamp head to drive the same about the said axes, said coupling means between the drive members and the lamp head including a pinion attached to the lamp head and a worm on the inner one of said shafts, meshing with said pinion.

12. A power-operated dirigible spotlight comprising a lamp head and a plurality of mounting means movably supporting the same for turning movements about two different axes; a pair of concentric drive shafts extending from said lamp head; a pair of juxtaposed, independently movable, fluid-responsive powered drive members disposed adjacent those ends of the shafts which are located remote from the lamp head, one of said members being rigid on the outer drive shaft; and means including said drive shafts, coupling said drive members to said lamp head to drive the same about the said axes, said coupling means between the drive members and the lamp head including a pair of spur gears providing a step-up ratio between one drive member and the inner one of said shafts.

13. A power-operated dirigible spotlight comprising a lamp head and a plurality of mounting means movably supporting the same for turning movements about two different axes; a pair of concentric drive shafts extending from said lamp head; a pair of juxtaposed independently movable, fluid-responsive powered drive members disposed adjacent those ends of the shafts which are located remote from the lamp head, one of said members being rigid on the outer drive shaft; and means including said drive shafts, coupling said drive members to said lamp head to drive the same about the said axes, said coupling means between the drive members and the lamp head including a pinion attached to the lamp head and a worm on the inner one of said shafts, meshing with said pinion, and including a pair of spur gears providing a step-up ratio between one drive member and the inner one of said shafts.

14. A power-operated dirigible spotlight comprising a lamp head and a plurality of mounting means movably supporting the same for turning movements about two different axes; a pair of concentric drive shafts extending from said lamp head; a pair of juxtaposed, independently movable, powered drive members disposed adjacent those ends of the shafts located remote from the lamp head; and means including said drive shafts, coupling said drive members to the lamp head to drive the same about the said axes, the inner one of said drive shafts having both axial and turning movement and being turnable simultaneously with the lamp head, said coupling means including a connection having relatively turnable parts, disposed between a powered member and said inner shaft, providing for free turning movement of the shaft with respect to the member while maintaining driving engagement axially at all times between the shaft and member.

15. A power-operated dirigible spotlight comprising a lamp head and a plurality of mounting means movably supporting the same for turning movements about two different axes; a pair of concentric drive shafts extending from said lamp head; a pair of juxtaposed, independently movable, powered drive members disposed adjacent those ends of the shafts located remote from the lamp head; and means including said drive shafts, coupling said drive members to said lamp head to drive the same about the said axes, one of said drive shafts being axially movable to drive the lamp head and being turnable therewith, and said coupling means including a loose, turnable connection means between one powered member and said one shaft, providing for free turning of the shaft with respect to the member while maintaining an axial drive therewith.

16. A power-operated dirigible spotlight comprising a lamp head and a plurality of mounting means movably supporting the same for turning movements about two different axes; a pair of concentric drive shafts extending from said lamp head; a pair of juxtaposed, independently movable, powered drive members disposed adjacent those ends of the shafts which are located remote from the lamp head; and means including said drive shafts, coupling said drive members to said lamp head to drive the same about the said axes, the inner one of said drive shafts being axially movable to drive the lamp head and being turnable therewith, and said coupling means including a connection between one powered member and said inner shaft, providing for free turning of the inner shaft with respect to the member, said connection comprising a sleeve turnable on the inner shaft, and comprising cooperable thread elements on the sleeve and powered member; and keying means preventing turning of said sleeve while permitting axial movement thereof.

17. A power-operated dirigible spotlight comprising a lamp head and a plurality of mounting means movably supporting the same for turning movements about two different axes; a pair of concentric drive shafts extending from said lamp head; a pair of juxtaposed, independently movable, powered drive members disposed adjacent those ends of the shafts which are located remote from the lamp head; and means including said drive shafts, coupling said drive members to said lamp head to drive the same about the said axes, the inner one of said drive shafts being axially movable to drive the lamp head and being turnable therewith, and said coupling means including a connection between one powered member and said inner shaft, providing for free turning of the shaft with respect to the member, said drive means between the said one powered member and the lamp head comprising a rack on the inner shaft and a pinion rigid with the lamp head and meshing with said rack.

18. In a power-operated dirigible spotlight, a lamp head having rigid therewith a pair of apertured bearing blocks the apertures of which have internal gear teeth; a pinion rod of uniform diameter and cross section, passing through said blocks and fully meshing with the teeth thereof to constitute therewith a splined connection; bearing means comprising collars having circular outer peripheries and comprising a second pair of apertured bearing blocks turnably carrying said collars, rotatably mounting said pinion rod; and means including a member movable with respect to said second pair of bearing blocks and meshing with said pinion rod, for turning the latter in response to movement of said member.

References Cited in the file of this patent

UNITED STATES PATENTS

| | | |
|---|---|---|
| 1,012,457 | Severson | Dec. 19, 1911 |
| 1,542,259 | Macy | June 16, 1925 |
| 1,833,308 | Russell | Nov. 24, 1931 |
| 2,014,454 | Russell | Sept. 17, 1935 |
| 2,049,802 | Hamm | Aug. 4, 1936 |
| 2,226,053 | Dahlstrom | Dec. 24, 1940 |
| 2,410,365 | Sauer | Oct. 29, 1946 |
| 2,557,784 | D'Arcey | June 19, 1951 |
| 2,778,241 | Gaubatz | Jan. 22, 1957 |